Figure 1:
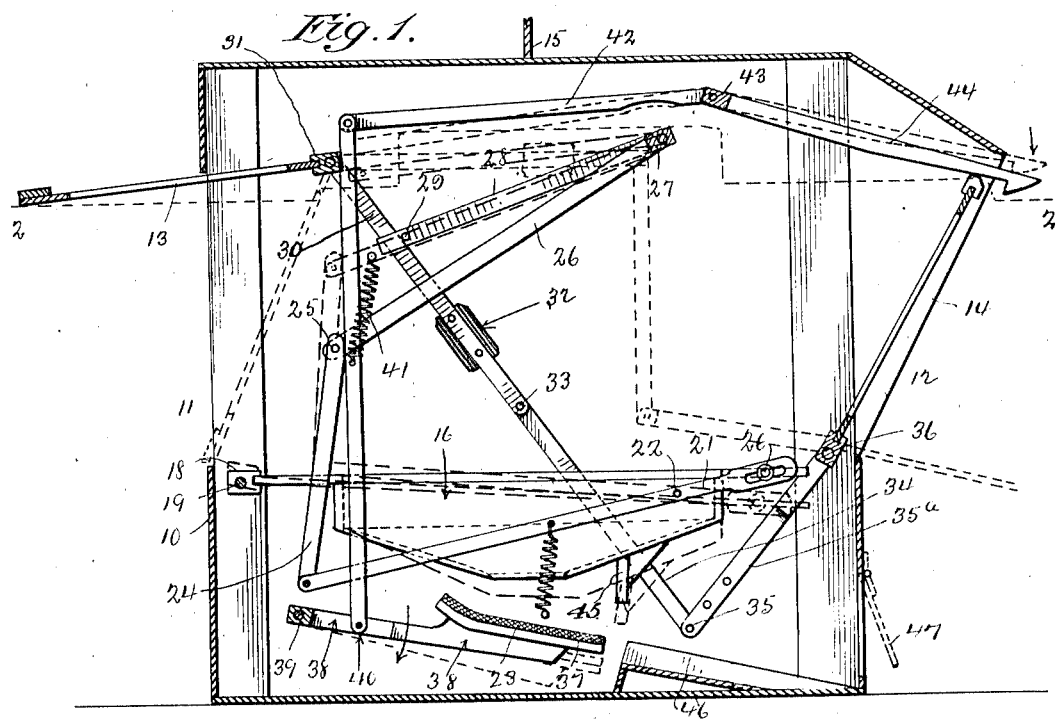

R. F. LE BROCQ.
HEN'S NEST.
APPLICATION FILED JUNE 7, 1912.

1,066,631.

Patented July 8, 1913.

Witnesses:

Richard F. Le Brocq, Inventor,
By his Attorney

UNITED STATES PATENT OFFICE.

RICHARD F. LE BROCQ, OF NEW YORK, N. Y., ASSIGNOR, BY MESNE ASSIGNMENTS, TO PROGRESSIVE HOLDING COMPANY, A CORPORATION OF NEW YORK.

HEN'S NEST.

1,066,631.  Specification of Letters Patent.  Patented July 8, 1913.

Application filed June 7, 1912. Serial No. 702,199.

*To all whom it may concern:*

Be it known that I, RICHARD F. LE BROCQ, of New York, Kings county, New York, have invented a new and useful Improvement in Hens' Nests, of which the following is a full, clear, and exact description.

My invention relates to improvements in hens' nests, and the object of my invention is to produce a nest which can be arranged in a partition between two pens so as to permit a hen to enter from one pen, lay an egg, and then make her exit into the opposite pen, thus keeping the non-layers in one compartment, and those that have laid in another.

My invention is intended, moreover, to provide means for giving a hen the necessary seclusion during the egg laying process, and to automatically open the exit door when the egg is dropped, and at the same time close the inlet door so that after she has laid she cannot go back among the hens who have not laid, but must make her exit into the pen where the layers are grouped.

The invention is also intended to leave the inlet door open until the egg is laid, so that if the hen does not actually lay an egg, but goes into the nest either from curiosity or before she is ready for the egg laying performance, she can make her exit through the door at which she entered. In other words, the opening and closing of the inlet and outlet doors is controlled by the actual dropping of the egg, and not by the mere fact that the hen has entered the nest.

A further object of my invention is to make the apparatus simple and practical, and to provide means for easily removing the eggs that are laid.

Reference is to be had to the accompanying drawings forming a part of this specification, in which similar reference characters indicate corresponding parts in all the views.

Figure 2:
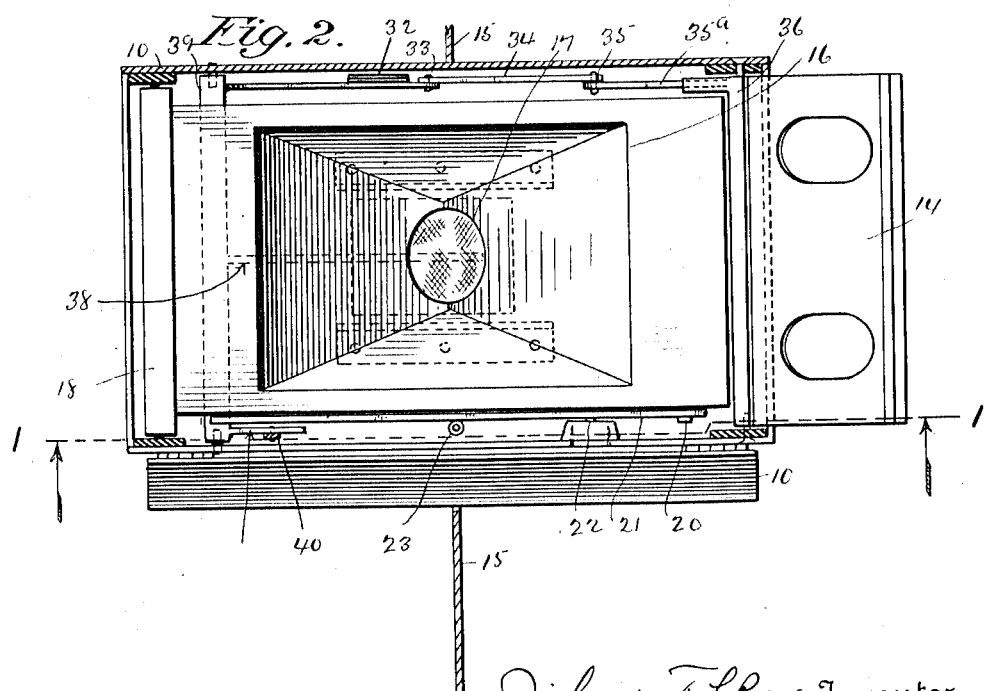

Figure 1 is a sectional elevation on the line 1—1 of Fig. 2, showing my improved apparatus, and Fig. 2 is a sectional plan on the line 2—2 of Fig. 1.

The nest is a box-like structure 10 having an inlet at 11 and an outlet at 12, and a series of these nests can be placed side by side if desired. The inlet is closed by a door 13, which is preferably of openwork construction so as to provide for ventilation, and which is preferably hinged at the top, and the outlet is closed by a door 14, also of open construction, and preferably hinged at the bottom. The partition 15 can abut with the nest so as to form a division fence between two compartments, as above referred to. Within the box or framework is a nest 16 which is also a box-like affair, and which can be made of any preferred shape, although it should be hollowed out to permit a hen to sit comfortably on it, and in the bottom of the nest proper is a hole 17 through which the egg drops. The nest proper is pivoted at the end near the inlet to the nest frame, and this is preferably done by securing the outer edge of the nest to the cross-bar 18 which is pivoted to the walls of the structure as shown at 19.

Near its free edge the nest has a sliding and pivotal connection on one side as shown at 20, with the lever 21 which is fulcrumed on the wall of the structure as shown at 22, and the longer end of the lever 21 is normally pulled down by a light spring 23 which, when a hen is not on the nest, will raise the front end of the lever and so lift the nest proper to a substantially horizontal position. The longer end of the lever 21 connects to a link 24 which extends upward at one end of the structure, and is pivoted at its upper end as shown at 25 to the arm 26 of the cross-bar 27 which extends across the upper part of the framework, is pivoted to the walls of the structure, and has a second arm 28 having near its free end a pin 29 riding on the arm 30 of the cross-bar 31, as shown in Fig. 1. This cross-bar is pivoted on the walls of the structure above the inlet 11, and carries the inlet door 13 already referred to. The arm 30 is normally depressed so as to raise and open the door 13 by a weight 32 which is attached to the arm, and the lower end of the arm is pivoted as shown at 33 to the link 34 which is pivoted at its lower end as shown at 35 to the arm 35ª of the cross-bar 36, which is pivoted in the walls of the structure adjacent to the outlet 12, and carries the outlet door 14. The pivotal connection between the link 34 and arm 35ª can be adjusted as shown in Fig. 1, so that the inlet and outlet doors 13 and 14 will move in proper relation.

Beneath the opening 17 of the nest 16, is a pad 37 which is carried on the free end of the lever 38, and this is pivoted at one end as shown at 39, and is pivotally connected with a link 40 which extends upward on one side of the apparatus, and is supported by a spring 41 which is secured to the link 40 and also to the side walls of the box 10, so that when the pad 37 is forced down, the spring 41 will tend to bring it back to its initial position and the link is in turn pivotally connected to an arm 42 of the cross-bar 43 which is arranged near the top of the structure, and carries a catch 44 which is rigid thereon and which engages the free edge of the door 14 and holds the latter closed. When the hen gets on the nest 16, it depresses the nest against the tension of the spring 23, and a ledge 45 on the under side of the nest extends downward in front of the pad 37 so as to hold an egg in place when the latter is dropped, and when the nest is raised, the egg will roll forward on the inclined chute 46, from which it can be easily removed by raising the door 47 at one end of the nest.

The apparatus operates as follows. When a hen enters the box through the inlet 11, and seats herself on the nest proper 16, the nest is depressed, but no action on the operating mechanism actually takes place unless an egg is dropped, in which case the weight of the egg tilts the lever 38, which pulls down the link 40, thus depressing the arm 42 and raising the catch 43 so that the door 14 drops by gravity, and opens to permit the hen to pass out into a different pen from the one in which she was confined before entering the structure. When the door 14 tips down it forms a platform on which the hen can readily walk out. As the door 14 tips down, the arm 35 is moved upward, which acting on the link 34 breaks the joint at 33 and tilts up the arm 30 against the tension of the weight 32, thus tilting the cross-bar 31 and closing the door 13, so that the hen is obliged to make her exit through the outlet 12. As she leaves the nest, the tension of the spring 23 tilts the lever 21 and restores the nest and doors to normal position.

I claim:—

1. A hen's nest comprising a box having an inlet and outlet, swinging doors to close said inlet and outlet, the outer door when opening swinging down to form a platform leading from the outlet, an operative lever connection between the two doors whereby the opening of one closes the other, a catch to hold the outlet door closed, a nest with a hole in it mounted in the box, a lever to catch an egg dropped through the hole in the nest, and an operative connection between the lever and the said catch whereby the dropping of the egg releases the catch.

2. A hen's nest comprising a box having an inlet and outlet, swinging doors closing the said inlet and outlet, the inlet door being hung at the top, and the outlet door being hung at the bottom so that when opened it will swing down and form a platform, a tilting nest mounted in the box, said nest having an aperture in the bottom, a tilting lever pivoted below the aperture in the nest and shaped to receive an egg, a catch to hold the outlet door closed, a tilting link and arm connecting the lever with the catch so that the depression of the lever releases the catch, and an operative connection between the two doors whereby the opening of one closes the other.

RICHARD F. LE BROCQ.

Witnesses:
WARREN B. HUTCHINSON,
D. C. SEWARD.